(12) United States Patent
Stephens, Jr.

(10) Patent No.: US 7,974,577 B2
(45) Date of Patent: Jul. 5, 2011

(54) DEVICES AND SYSTEMS FOR IMPROVED WIRELESS COMMUNICATION

(75) Inventor: Kenneth Dean Stephens, Jr., Waialua, HI (US)

(73) Assignee: Tazzle, Inc., Nashville, TN (US)

( * ) Notice: Subject to any disclaimer, the term of this patent is extended or adjusted under 35 U.S.C. 154(b) by 865 days.

(21) Appl. No.: 11/685,690

(22) Filed: Mar. 13, 2007

(65) Prior Publication Data

US 2007/0287493 A1 Dec. 13, 2007

Related U.S. Application Data

(60) Provisional application No. 60/791,370, filed on Apr. 11, 2006.

(51) Int. Cl.
*H04B 7/00* (2006.01)

(52) U.S. Cl. .............. 455/41.2; 455/432.2; 455/410; 709/217; 710/313

(58) Field of Classification Search .............. 455/41.2, 455/432.2, 410, 414.4, 186.1; 709/217, 227; 710/313; 375/130
See application file for complete search history.

(56) References Cited

U.S. PATENT DOCUMENTS

| | | | | |
|---|---|---|---|---|
| 6,785,807 B1 * | 8/2004 | Aguilar et al. | ...................... | 713/2 |
| 6,892,248 B2 * | 5/2005 | Thayer | ................................. | 710/2 |
| 6,950,859 B1 * | 9/2005 | Bartek et al. | ................... | 709/217 |
| 7,127,541 B2 * | 10/2006 | Govindarajulu et al. | ...... | 710/300 |
| 7,136,904 B2 * | 11/2006 | Bartek et al. | ................... | 709/217 |
| 7,221,908 B2 * | 5/2007 | Fukuda | ............................. | 455/40 |
| 7,305,511 B2 * | 12/2007 | Barrett et al. | ................. | 710/316 |
| 7,309,260 B2 * | 12/2007 | Brower et al. | ................. | 439/676 |
| 7,597,250 B2 * | 10/2009 | Finn | ................................ | 235/380 |
| 2002/0116604 A1 * | 8/2002 | Thayer | ................................ | 713/1 |
| 2004/0122649 A1 * | 6/2004 | Bartek et al. | ...................... | 703/23 |
| 2005/0027910 A1 * | 2/2005 | Barrett et al. | ...................... | 710/62 |
| 2005/0027918 A1 * | 2/2005 | Govindarajulu et al. | ...... | 710/313 |
| 2006/0046774 A1 * | 3/2006 | Fukuda | .......................... | 455/556.1 |
| 2006/0166173 A1 * | 7/2006 | Ellis et al. | ....................... | 434/185 |
| 2006/0190238 A1 * | 8/2006 | Autor et al. | ...................... | 703/25 |
| 2006/0219776 A1 * | 10/2006 | Finn | ................................ | 235/380 |
| 2009/0046200 A1 * | 2/2009 | Chiu et al. | ..................... | 348/372 |
| 2009/0077549 A1 * | 3/2009 | Sadja et al. | .................... | 717/178 |
| 2009/0301522 A1 * | 12/2009 | Abehasera et al. | ............. | 134/18 |
| 2009/0318081 A1 * | 12/2009 | Winter | .......................... | 455/41.2 |

* cited by examiner

*Primary Examiner* — Minh D Dao
(74) *Attorney, Agent, or Firm* — Orrick, Herrington & Sutcliffe, LLP

(57) ABSTRACT

A communication device for supporting wireless communication between a host system and a target system and methods for manufacturing and using same. In one preferred embodiment, the communication device can include a host adapter and a wireless transceiver. When coupled with a communication port of the host system, the host adapter exchanges data signals over a virtual communication port of the host system and supports conversion between the data signals and serial data signals. The wireless transceiver converts the serial data signals received from the host adapter into outgoing wireless signals for broadcast to the target system and incoming wireless signals received from the target system into the serial data signals for transmission to the host adapter. Thereby, the host adapter, when coupled with the host system, operates as a hardware firewall, rendering the wireless transceiver invisible to the host system's operating system.

28 Claims, 10 Drawing Sheets

Devices and Systems for Improved Wireless Communication

Devices and Systems for Improved Wireless Communication

Devices and Systems for Improved Wireless Communication

Devices and Systems for Improved Wireless Communication

Fig. 12A

Devices and Systems for Improved Wireless Communication

Devices and Systems for Improved Wireless Communication

Inventor: Kenneth Dean Stephens, Jr.

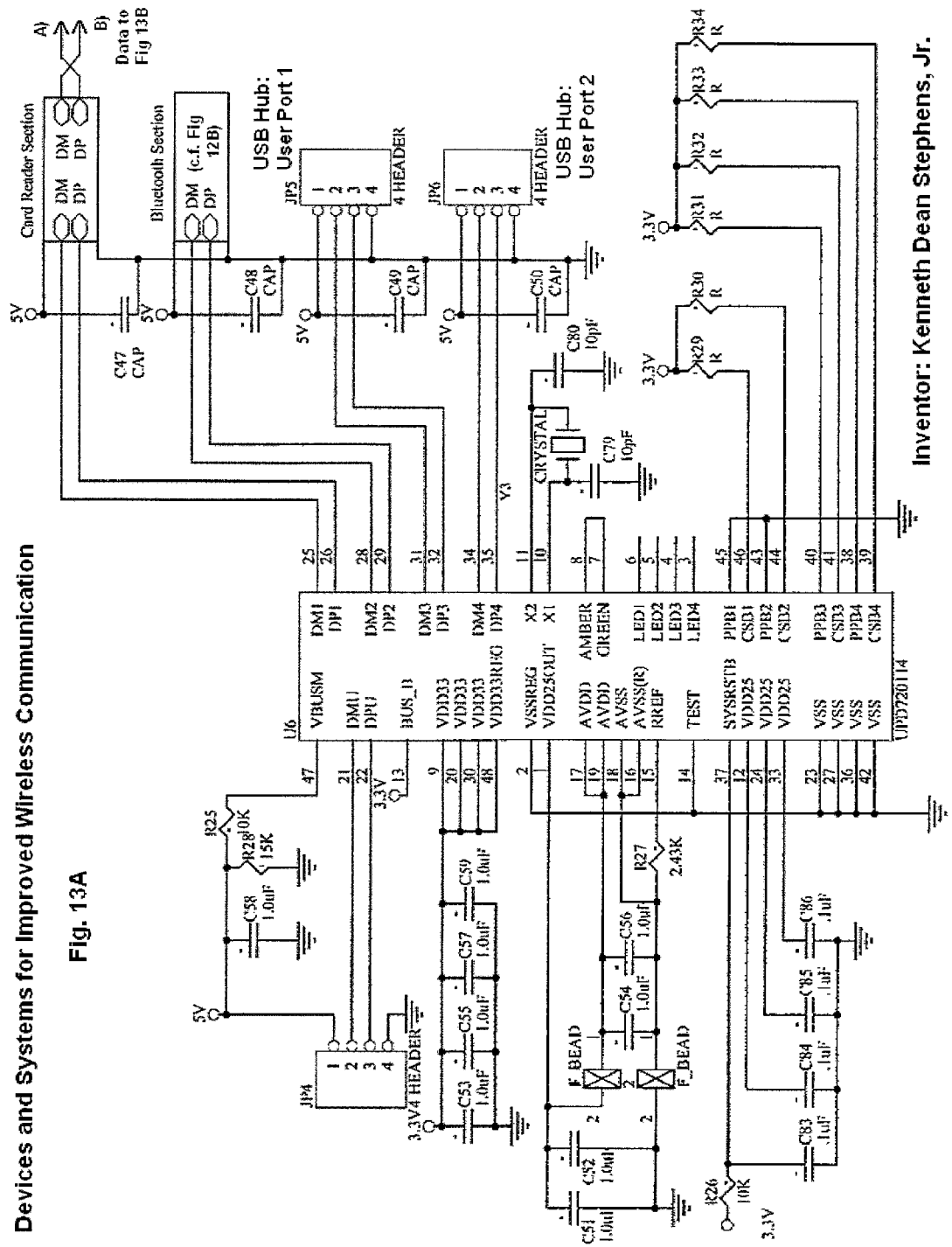

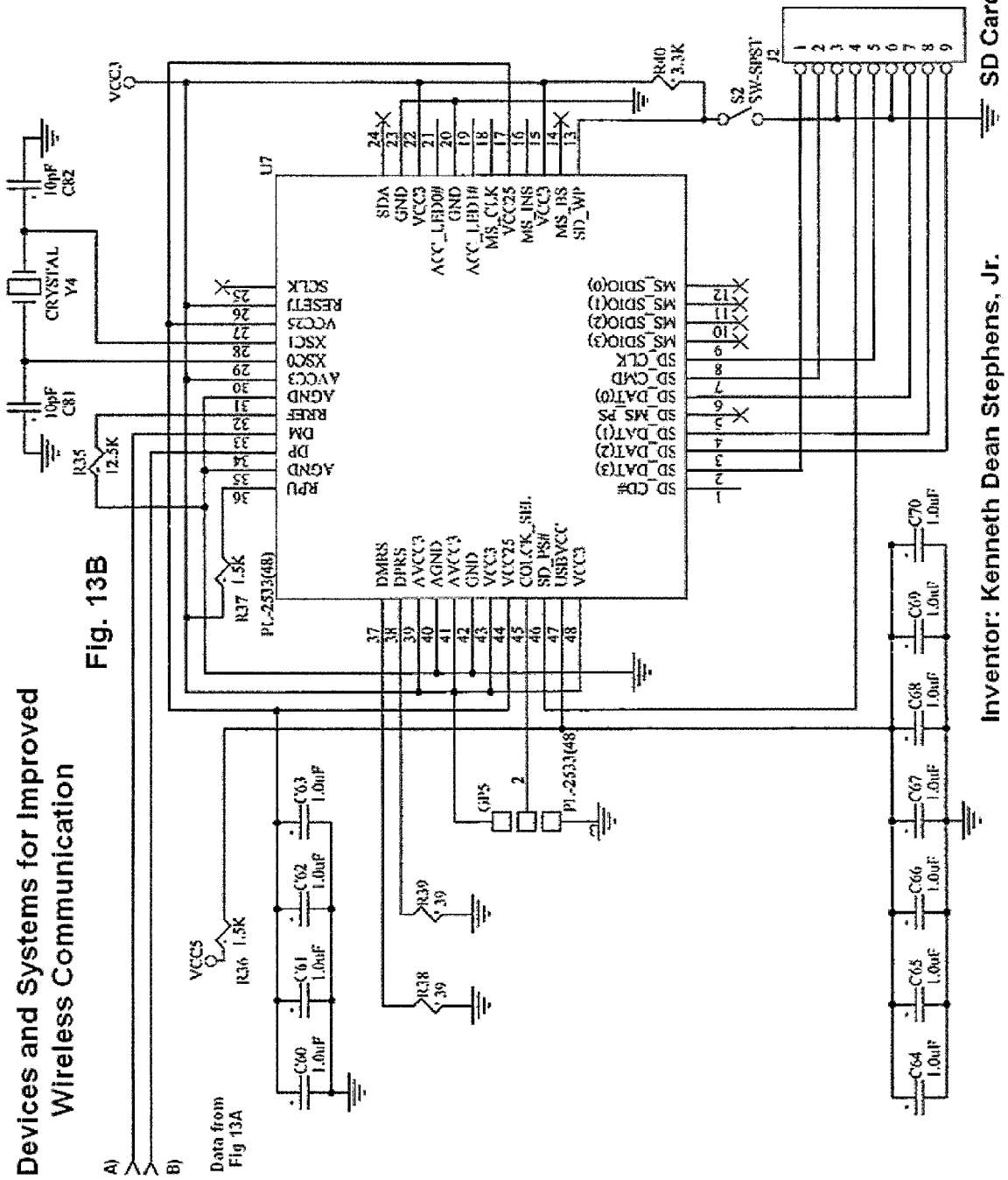

Devices and Systems for Improved Wireless Communication

DEVICES AND SYSTEMS FOR IMPROVED WIRELESS COMMUNICATION

CROSS-REFERENCE TO RELATED APPLICATION

This application claims priority to U.S. Provisional Application Ser. No. 60/791,370, filed on Apr. 11, 2006. Priority to the prior application is expressly claimed, and the disclosure of the application is hereby incorporated by reference in its entirety.

FIELD

The present invention relates generally to wireless communication and more particularly, but not exclusively, to wireless devices and systems operating on the Bluetooth® standard.

BACKGROUND

Bluetooth® is one of the most widely-produced technology standards in history, with approximately 300 million devices shipped in 2005, 500 million predicted for 2006, and one billion product shipments forecast by the year 2008.

From its inception in the late 1990s, Bluetooth's® promise has always been connectivity, particularly Personal Area Networking (PAN), where users make ad hoc connections to Bluetooth®-enabled computers, kiosks, handheld products and various other devices within a short (10 meter or 100 meter) range around their Bluetooth® device.

But the driving force behind the tremendous growth of Bluetooth® has almost exclusively come from another attribute of the technology; namely, cable replacement: for wireless mice, keyboards and other computer peripherals, and especially wireless headsets for mobile telephony, in cell phones, smart phones and the like. As for Bluetooth's® promise for easy PAN connectivity, it remains largely unfulfilled more than 7 years after it's initial rollout in 1999.

The inventor and his company have long been dedicated to computer and communication device connectivity, producing many novel and useful products and technologies aimed at ease of use, secure and robust connections and maximum data throughput for a given channel, system or technology. Consequently, it was natural that we would be attracted to the promises of Bluetooth® almost since the standard was announced.

Design application-level software has been developed to maximize Bluetooth® user experience, and proprietary Input/Output (I/O) middleware to access Bluetooth's® Serial Communication Port (SPP) standard, occupying an actual or virtual COM Port on computers, Personal Data Assistants (PDAs), smart phones and the like.

As useful as this software was, other challenges remained to user acceptance of Bluetooth® connectivity in systems and devices finding their way to market. In 2003 I filed a Provisional Patent Application with the United States Patent and Trademark Office (USPTO) entitled "Communication Devices with Self-Contained Software" (Application No. 60/452,220, filing date Mar. 5, 2003), focusing on the addition of on-device memory to Bluetooth® devices. The self-contained memory stored application and install software and documentation, with ample space available for user files, presentations, photos, music and the like. The Prior Art and Prior Disclosure sections to follow will describe these developments in further detail.

User-friendly applications and built-in memory made Bluetooth® considerably more compelling for Personal Area Networking and ad hoc connectivity, but installation and setup remained sufficiently difficult as to frighten off all but the most persistent and "nerdy" users. The dominant Widcomm® install software was cumbersome and often unstable, sometimes working and sometimes not, especially on computers with late-version Windows® XP operating system (OS).

Since the inception of Windows® XP, Service Pack 2 (SP2), Bluetooth® devices have assumed a certain degree of "plug-and-play" capability, being automatically recognized and installed by the OS. In this now-prevalent case, Widcomm and other industry drivers are no longer recognized by Windows®, which installs it's own, profile-limited Bluetooth® drivers which further add to the complexity and confusion of hapless users.

Consider: under Windows® XP/SP2, every remote Bluetooth® device must occupy one COM Port as Master ("Outgoing" mode in Windows® speak) and another distinct COM Port in Slave ("Incoming") mode. Moreover, these 2 COM Ports for each and every Bluetooth® device discovered and added under SP2 are distinct from every other Bluetooth® node, even for 2 USB dongles, say, of the same brand and model. Put another way, if my personal area network comprises 20 devices—cell phones, PDAs, kiosks and other computers—I am forced to keep track of 40 different incoming and outgoing COM Port combinations.

With a process so complicated, cumbersome and distracting, it is little wonder that Bluetooth® connectivity with or between computers has never caught on. This inventor and his company have developed novel and proprietary systems, including hardware and software, that overcome all of the present barriers to Bluetooth® connectivity and use, with the potential to open a wireless portal between millions of computers and hundreds of millions of mobile phones, PDAs and other computers.

With driver installation in seconds at the click of a button or icon, the hardware described below is connected to its host computer and ready to discover or be discovered by a remote Bluetooth® device. The Advanced BlueKey® (ABK) device disclosed in this application occupies a single COM Port for both Master and Slave, and that same single COM Port for each and every BlueKey® device that is connected to that host.

With discovery complete, menu-driven BlueKey® application software on each end allows the user(s) to print, view, edit, run, play or share files, folders, music, photos, albums, emails or presentations by selecting the data to transfer and clicking "Apply," a process many times simpler than any known Bluetooth® operation of today.

SUMMARY

Although it is one of the most successful and widely-produced technology standards in history, Bluetooth® has yet to fulfill its promise to connect millions of computers, cell phones, PDAs and other devices. Although 300 million Bluetooth® devices shipped in 2005 and a billion shipments are forecast by the year 2008, the driving force behind the tremendous growth of Bluetooth® has almost exclusively come from cable replacement: for peripherals like wireless mice, keyboards, and especially cordless headsets for mobile telephony.

From its inception in the late 1990s to the present time, Bluetooth's® promise to empower users to make simple ad hoc connections to computers, kiosks, handheld products and other devices within their 10 or 100 meter Personal Area Network space has remained unfulfilled. Bluetooth® connectivity remains difficult beyond the ability and patience of the average user, with unstable and complex software, bloated installers and little to offer in the way of utility.

The exemplary embodiments disclosed herein illustrate how most of the barriers to widespread Bluetooth® use and acceptance are overcome, allowing it to assume its place as the important connectivity tool it was always supposed to be.

Together with the proprietary application and communication software developed by the inventor and his company, the disclosed systems and devices virtually eliminate all of the barriers to widespread Bluetooth® connectivity.

BRIEF DESCRIPTION OF THE DRAWINGS

FIGS. 12A-B are an exemplary detail drawing illustrating a preferred embodiment of the Advanced BlueKey® device of FIGS. 10A-B.

FIGS. 13A-B are an exemplary detail drawing illustrating a preferred embodiment of the Advanced BlueKey® device of FIGS. 11A-B.

Figure 1:
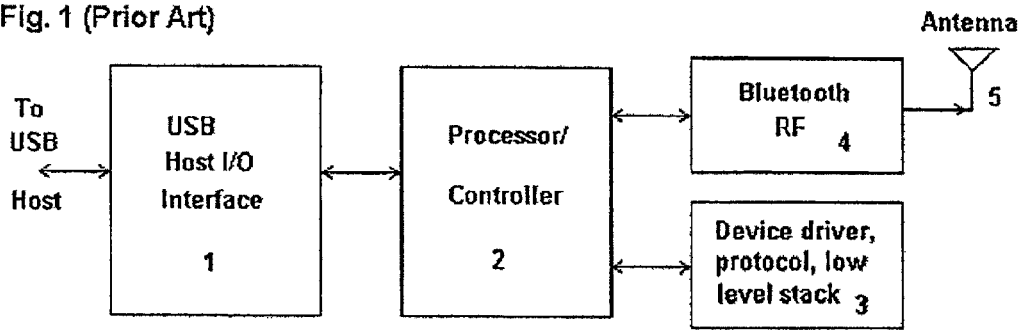
FIG. 1 is an exemplary top-level block diagram illustrating an embodiment of a prior art Bluetooth® configuration, wherein a USB Host I/O Interface section translates data from and to a USB host.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not illustrate every aspect of the present invention and do not limit the scope of the invention.

DETAILED DESCRIPTION OF THE DRAWINGS

FIG. 1 depicts a typical Bluetooth® configuration, wherein a Universal Serial Bus (USB) Host I/O Interface section 1 translates data from and to a USB host such as a computer on one hand, and to and from a Processor/Controller 2 on the other, said Processor/Controller operating as a Bluetooth® baseband module to interface with a Bluetooth® RF module 4 and antenna 5 as well as internal memory storing device driver, protocol and low level stack functions 3. This memory is not available to the user.

USB Bluetooth® devices or dongles such as this are currently in widespread use. An example of one such USB Bluetooth® dongle can be found in United States Patent application US2002/0159419 A1.

Figure 2:
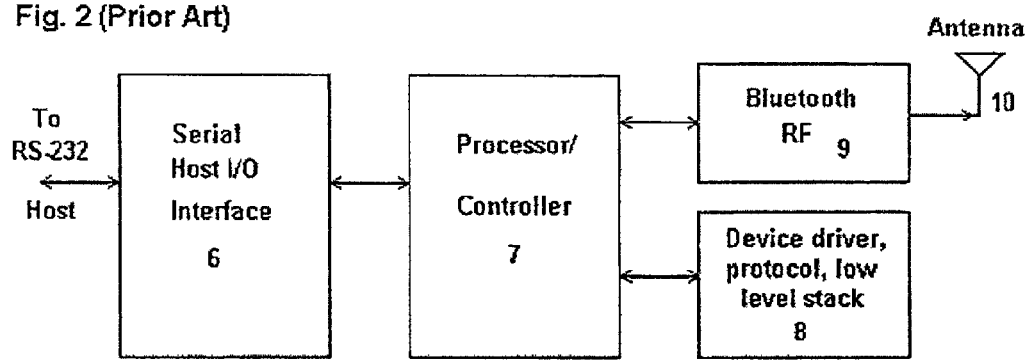
FIG. 2 is an alternative embodiment of the Bluetooth® configuration of FIG. 1, wherein the USB Host I/O Interface section communicates via an RS-232 serial communication port.

FIG. 2 has elements corresponding to those in FIG. 1, except the host interface in FIG. 2 is via an RS-232 serial communication port. Thus the Host I/O Interface 6 communicates over RS-232 protocol at the host side, translating input and output data as before for Processor/Controller 17 which connects to Bluetooth® RF module 9, Antenna 10 and the device driver, protocol and low level stack 8.

While not in such widespread use as the USB Bluetooth® dongle of FIG. 1, a number of companies manufacture and market Serial Bluetooth® devices like this. An example is the "Cordless Serial Adapter with Bluetooth® Wireless Technology" from Socket Communications: www.socketcom.com.

Figure 3:
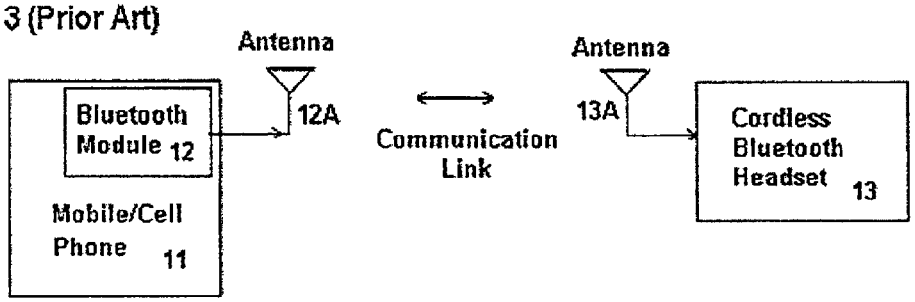
FIG. 3 is an exemplary top-level diagram illustrating an embodiment of a prior art mobile/cell phone comprising a Bluetooth® module and Bluetooth® Antenna.

FIG. 3 shows a Mobile/Cell Phone 11 containing Bluetooth® module 12 and Bluetooth® Antenna 12A. The most widespread use of Bluetooth® technology to date involves mobile phones such as this, with a Communication Link to a Cordless Bluetooth® headset 13 and Antenna 13A.

While this wireless headset cable replacement model calls upon the Bluetooth® headset profile to pass two-way audio data back and forth between the mobile phone and its cordless headset, it is also likely to call upon the same Bluetooth® discovery profiles as disclosed herein.

Of equal importance is another profile which is either active or present for activation in such Bluetooth®-enabled mobile phones, namely the Serial Port Profile as disclosed herein.

Figure 4:
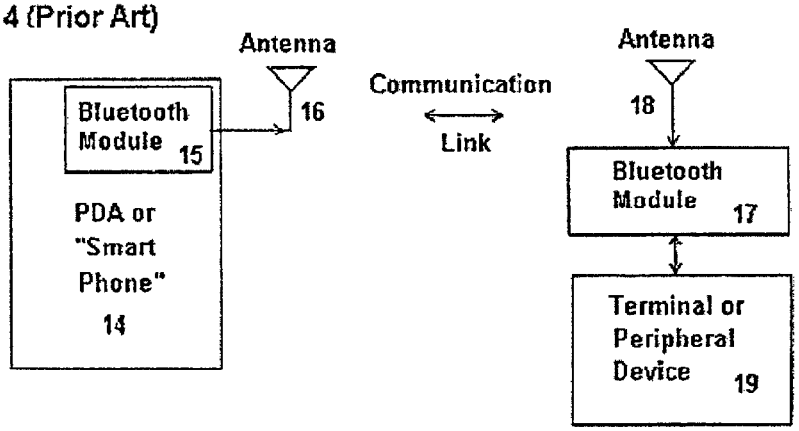
FIG. 4 is an alternative embodiment of the mobile/cell phone of FIG. 3, wherein the mobile/cell phone comprises a Bluetooth®-enabled PDA or "Smart Phone."

FIG. 4 features a Bluetooth®-enabled PDA or "Smart Phone" 14 rather than the more generic cell phone of FIG. 3. This device also contains a Bluetooth® Module 15 and Bluetooth® Antenna 16, with a Communication Link to a remote Bluetooth® Module 17 and its Antenna 18. While Bluetooth® in the PDA or Smart Phone in FIG. 4 can similarly be used for cordless headset operation as in FIG. 3, it is just as likely to connect to a Terminal or Peripheral Device 19. A computer is an example of a terminal device, while peripheral devices might include keyboards, mice and printers.

PDAs and Smart Phones are very likely to have an actively-functioning Serial Port Profile as well as discovery and other profiles from the Bluetooth® specification. As a consequence, such devices are excellent candidates for the features disclosed herein. The Palm® family of Bluetooth®-enabled devices already function with the disclosed embodiments, including Palm's Zire 72 PDA and Treo 650 smart phone.

Figure 5:
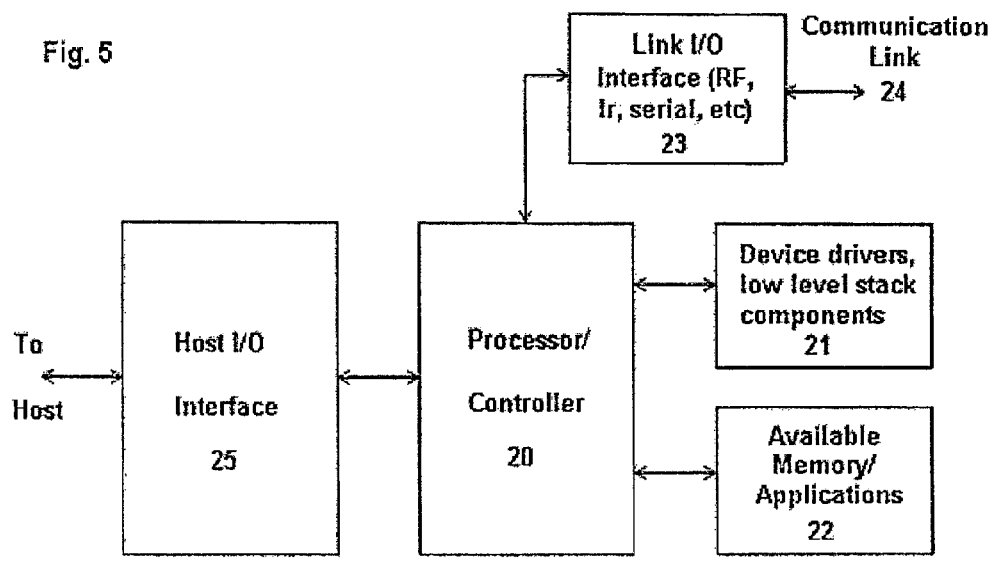
FIG. 5 is an exemplary top-level diagram illustrating an embodiment of a Bluetooth® device, wherein the Bluetooth® device includes an on-device memory system.

FIG. 5 is a general block of one preferred embodiment, combining a communication device and accessible memory in a single form factor. In this embodiment, a processor/controller 20 communicates with low level memory area 21, wherein memory is allocated for device drivers, low level stack and protocol functions; and with high level memory area 22, with memory available for applications and user storage. While memory portions allocated to low level functions and applications may be accessible for upgrade and modification by authorized personnel, user ability to erase or modify these areas can be hidden or obstructed by various known means.

On the other hand, designated memory in flash or other read-write form may be completely user-accessible to provide reusable storage. In addition to flash, read-only memory, firmware, or non-volatile memory could be utilized for such functions as drivers and low level protocol software, installation software and user applications. Portions of the memory may also provide such benefits to the user as password or other entry security.

Processor/controller 20 likewise communicates with link I/O interface 23, incorporating components necessary to exchange digital information over a communication link 24. According to my previous Provisional Patent Application, communication from interface 23 and over link 24 may be via radio frequency (RF), infrared (IR), cable or other known communication means. Host I/O interface 25 translates memory and link data from processor/controller 20 for interface with a host device, which may be a computer or other digital device.

Figure 6:
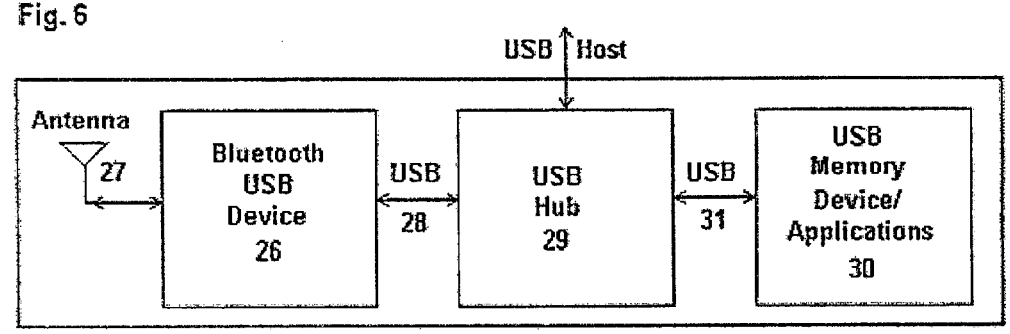
FIG. 6 is an exemplary top-level diagram illustrating an alternative embodiment of the Bluetooth® device of FIG. 5.

FIG. 6 depicts three separate USB devices interconnected and unified in a single USB dongle form factor 46. Bluetooth® USB device 26 (c.f. FIG. 1) sends and receives RF signals via antenna 27, and also has a USB connection 28 to a USB hub 29. USB Memory device 30 contains memory space for both low and high level applications, and may contain additional memory accessible for user storage. USB hub 29 is connected to memory device 30 via USB connection 31. USB Hub 29 interfaces with a host computer or other device.

Although the operation of the interconnected devices in FIG. 6 is indistinguishable from connecting a USB Bluetooth dongle, a USB storage dongle and a USB hub with USB connectors and cables, it is understood that the devices in FIG. 6 are mounted in close proximity within a single USB dongle 46 similar to the form depicted in FIG. 9B below. The only USB connector utilized is found at the output of hub 29.

Figure 7:
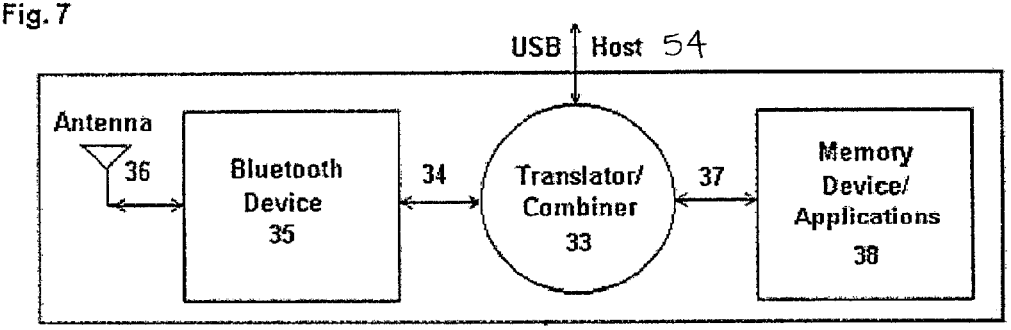
FIG. 7 is an exemplary top-level diagram illustrating another alternative embodiment of the Bluetooth® device of FIG. 5, wherein the Bluetooth® device is configured to communicate with a USB host system.

FIG. 7 is an exemplary top-level diagram illustrating another alternative embodiment of the Bluetooth® device of FIG. 5. As shown in FIG. 7, a translator/combiner 33 communicates 1) over connection 34 with a Bluetooth device 35 connected to antenna 36; 2) over connection 37 with a memory device 38, including low and high level applications; and 3) to a host device via USB connector 54.

In this case, translator/combiner 33 may variously serve as a translator or processor of signals from both Bluetooth and memory modules, translating them from whatever form into a combined USB stream in the manner of a virtual hub.

Figure 8:
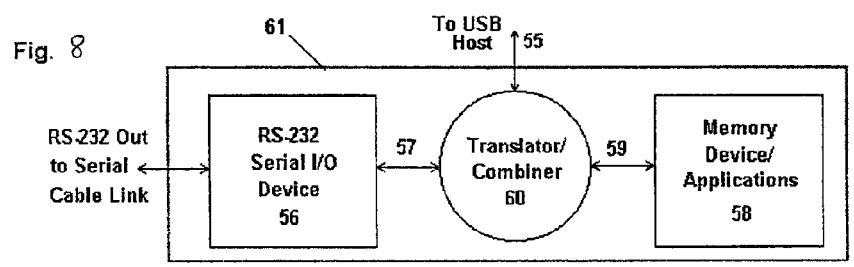
FIG. 8 is an exemplary top-level diagram illustrating an alternative embodiment of the Bluetooth® device of FIG. 7, wherein the Bluetooth® device is configured to communicate with a serial I/O device via an RS-232 communication link.

FIG. 8 is a specific embodiment of FIG. 7, wherein a translator/combiner 60 communicates 1) via connection 57 with a serial I/O device 56, said serial device having RS-232 output connector to a cable link; 2) through connection 59 with a memory device 58 incorporating both low and high level applications; and 3) to a host device via USB connector 55. All devices and circuit modules are housed together in a USB form factor 61.

Figure 9:
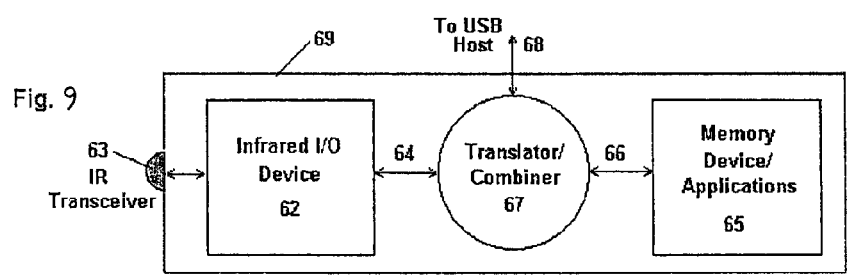
FIG. 9 is an exemplary top-level diagram illustrating another alternative embodiment of the Bluetooth® device of FIG. 7, wherein the Bluetooth® device is configured to communicate with an infrared I/O device via an infrared communication link.

FIG. 9 shows another specific embodiment of FIG. 7, wherein a translator/combiner 67 communicates 1) over connection 64 with an Infrared I/O device 62 which in turns sends and receives signals from IR transceiver 63; 2) through connection 66 with a memory device 65 incorporating both low and high level applications; and 3) to a host device via USB connector 68. All devices and circuit modules are housed together in a USB form factor 69.

The specification advantageously discloses novel and proprietary improvements to Bluetooth® connectivity and usefulness in general. Individual and systemic features and improvements will be discussed with reference to the figures below.

Figure 10A:
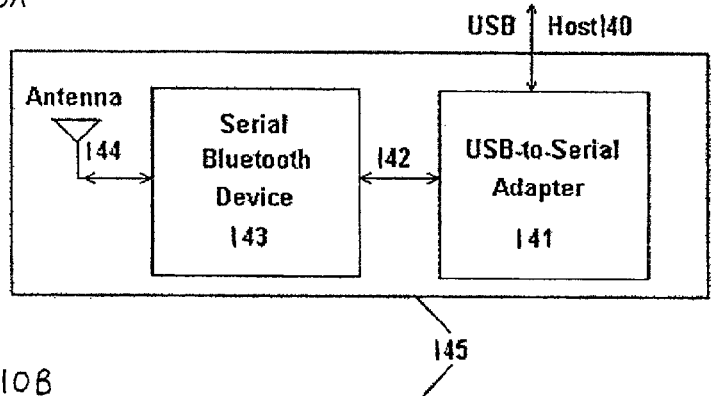
FIG. 10A is an exemplary top-level diagram illustrating an embodiment of an "Advanced BlueKey®" device, wherein the "Advanced BlueKey®" device enables a USB Host to connect with a USB-to-Serial Adapter.

FIG. 10A depicts one embodiment of an "Advanced BlueKey®" device, wherein USB Host 140 connects to a USB-to-Serial Adapter 141. Installation of the OS driver for the USB-to-Serial Adapter creates a Virtual COM Port on the host device, which may be a Personal Computer operating on any Windows® 98, 98SE, ME, 2000, XP Home or Professional, or the various editions (versions, iterations) of Vista.

Data in and out of USB-to-Serial Adapter 141 connects to a Serial Bluetooth® Device or module 143 via connection 142, which passes logic-level serial data between the sections as opposed to RS-232 physical layer data. Put another way, no RS-232 driver circuits, interfaces or converters are necessary for the operation of the device shown in FIG. 10A.

The data-modulated RF output from Serial Bluetooth® Device 143 is connected to Bluetooth® Antenna 144 from which it radiates outward approximately 10 or 100 meters, depending on the class of the Bluetooth® transmitter selected. The circuitry in FIG. 10A is shown in more detail in FIGS. 12A-B below.

When installation of the device depicted in FIG. 10A is complete, and upon its insertion into an available USB port, the host computer will recognize a new USB-Serial device like the PL-2303X integrated circuit from Prolific Technologies presently preferred. In this configuration, the USB-Serial device effectively acts as a hardware firewall, removing the Serial Bluetooth® device from the "prying eyes" of the Windows® or other operating system.

This novel use of a USB-Serial device as a shield for the Bluetooth® portion of the dongle yields several important advantages and improvements over the current Bluetooth® connectivity art:

1. The USB-hosted Bluetooth® dongle disclosed above installs in seconds from a small, 1.6 MB installer. Typical Widcomm® USB-Bluetooth® installers are 10-20 times larger and take 10-20 times as long to install.

2. The installer of this embodiment does not require restarting the computer, while a Widcomm® installer typically does.

3. The installer of this embodiment creates a single Virtual COM Port on the host computer, present only when the Advanced BlueKey® (ABK) device is connected. The Widcomm® installer typically creates 11 COM Ports and many other artifacts that permanently remain on the host computer whether or not a USB Bluetooth® dongle is connected.

4. Vista is the OS version currently being shipped with new Windows® computers. Vista and newer XP machines have a pre-installed driver set that recognizes USB Bluetooth® devices, then imposes an incredibly complex hierarchy of COM Ports: one "Outgoing" (Master) and one "Incoming" (Slave) for each and every remote Bluetooth® device encountered. A traveler making ad hoc connections with—say—20 Bluetooth® devices along her way might be forced to keep track of 40 distinct COM Ports.

5. In contrast, the exemplary ABK device creates a single COM Port, regardless of whether operation is in Master or Slave mode, and regardless of what remote Bluetooth® device it connects to. If COM 5 is ABK's initial COM Port, COM 5 will remain its port whether sending or receiving initiating a connection or being discovered.

6. Windows® Vista and later XP versions do something even more disruptive when detecting a conventional USB Bluetooth® dongle. If two of these computers are attempting to connect and communicate, the OS effectively "hijacks" Bluetooth® operation, disallowing COM Port connectivity and subsequent data exchange by any means other than a poor and weak file transfer utility native to Windows®.

7. But if even one of these computers hosts the present embodiment of the ABK device, the Bluetooth® portion of that device will not be detected by Windows®. Consequently, Bluetooth® service on that computer cannot be hijacked, and the BlueKey® application can run on each end.

If ABK is installed on a guest computer, no unwanted artifacts remain when the device is disconnected. Moreover, the BlueKey® application designed by the inventor and his company can run from a removable storage device, leaving no trace of itself on the guest computer.

The illustrative embodiments of the ABK devices disclosed herein run on the Serial Port Profile (SPP), the most generic and prevalent of all Bluetooth® profiles. As a consequence, connectivity with most Bluetooth®-enabled cell phones, PDAs, computers and other devices is assured.

Figure 10B:
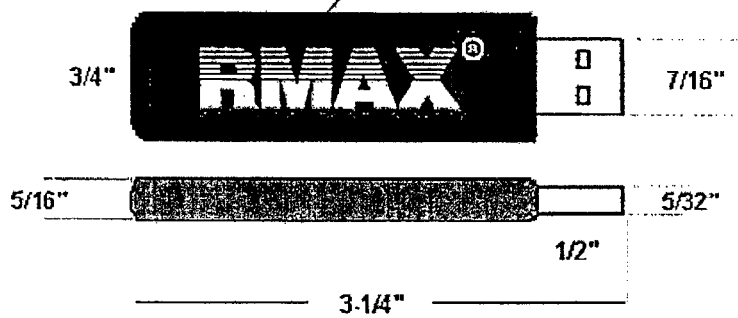
FIG. 10B is an exemplary detail drawing illustrating a preferred form factor of the Advanced BlueKey® device of FIG. 10A.

FIG. 10B illustrates the form factor of an Advanced BlueKey® device being made by the inventor's company. This enclosure conforms to USB dongle dimensions: 2.75" length, 0.75" width, and 0.3125" depth. Overall length, including USB connector, 3.25".

Figure 11A:
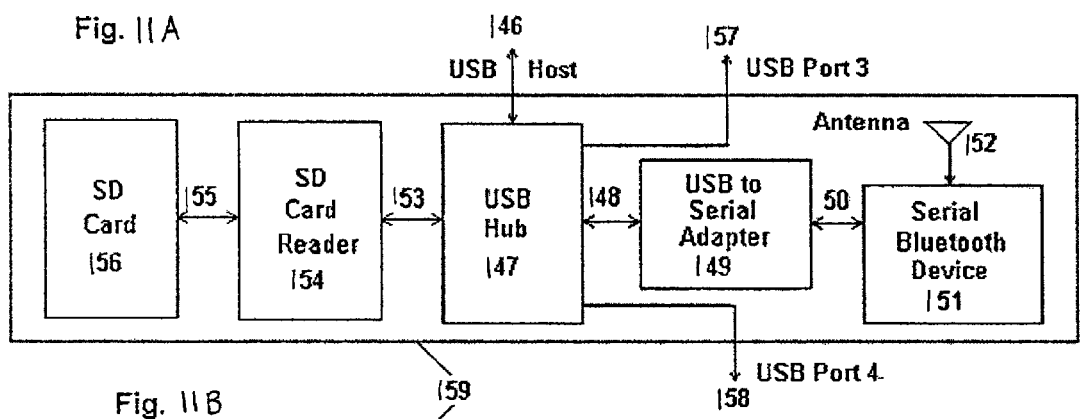
FIG. 11A is an exemplary top-level diagram illustrating an alternative embodiment of the Advanced BlueKey® device of FIGS. 10A-B, wherein the "Advanced BlueKey®" device communicates with the USB Host via a USB communication hub.

FIG. 11A shows another Advanced BlueKey® device with several features additional to those in FIG. 10A. In this configuration, a USB Host device 146 connects to USB Hub 147, a 4-port-out hub in the example. Two of the outputs 157, 158 may go to USB female connectors to give the user at least two extra USB ports for whatever use, including replacement of the one taken up by the ABK device. Since the ABK device requires only two hub outputs, a 4-port hub yields two user ports, a 6-port hub, four ports, and so on.

Another output from USB Hub 147 connects on line 148 to a USB-Serial adapter 149 like the one delineated in FIG. 10A. The USB-Serial adapter in turn connects to Serial Bluetooth® device 151 and from there to Antenna 152 in the manner set forth above. In fact, the block diagram between 148 and 151 is exactly the same as the one divulged in FIG. 10A.

Connection 153 from USB Hub 147 goes to SD (Secure Digital) Card Reader 154, and the Reader further connects via 155 to a removable SD card 156. Although this section is somewhat akin to the USB Memory 30 specified in Prior Disclosure FIG. 6, it has the distinct advantage of being removable and of user-selectable memory size. Needless to say, a card standard other than SD might be chosen and the appropriate Reader circuit substituted. Likewise the device could accommodate multiple removable memory card standards.

The following are features and benefits of the embodiment in FIG. 11A in addition to the seven improvements described under FIG. 10A:

1. This Advanced BlueKey® version includes a USB Hub, not only to replace the USB port it occupies, but also to provide the user with one or more additional USB ports for whatever use.

2. This ABK version comes with a built-in SD Card Reader to accommodate removable memory cards of any desired size between 16 MB and 8 GB, with even higher memory sizes being developed by the SD card industry.

3. The SD Card standard is the most commonly used of all removable memory standards. This tends to offer users insurance against obsolescence. Moreover, the same reader will directly accommodate MMC (Multi Media Card), and smaller Mini and Micro SD cards with a readily-available adapter frame.

4. For the reasons given under points 2 and 3 and others, utilizing an SD Card reader is forward-looking, offering a relatively secure and "future proof" memory standard.

5. Like fixed flash, a some portion of the memory will contain the device's simple install software, BlueKey® application, BlueKey® portal software for PalmOS devices, and documentation including user manuals. On a 1 GB card, this data may comprise 4 MB, leaving 999,996 MB of memory available to the user.

6. Utilizing a removable memory medium like SD also opens another important feature to the user; namely, the ability to "sneakernet" large amounts of data between computers. Put another way, this Advanced BlueKey device can also serve as a simple SD card reader to receive data from and make data available to whatever host computer or device it is connected to.

7. Moreover, many handheld cell phones, smart phones and PDAs accommodate SD cards, making it possible to move our SD card from its ABK reader to, for instance, a Palm® Zire 72 PDA or Treo 650 smart phone. This translates to fewer devices for the traveler.

8. Also possible on this ABK model's SD Card is software that allows travelers to replicate their own computer desktop on any Windows® host along their way, including favorites, shortcuts, user settings, email and even wallpaper. This means travelers need little more than their Bluetooth®-equipped smart phone (PDA or cell phone) and one of these ABK devices. As desired, the software for replicating the traveler's computer can be included on the flash storage. An example of such replication software is made by Migo: http://www.migosoftware.com/migoproducts.php.

Figure 11B:
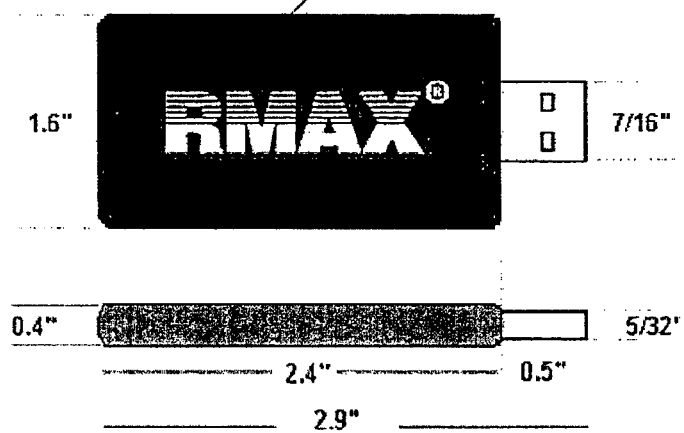
FIG. 11B is an exemplary detail drawing illustrating a preferred form factor of the Advanced BlueKey® device of FIG. 11A.

FIG. 11B depicts the form factor for the Advanced BlueKey® device disclosed in FIG. 11A. Length is 2.4" (2.9" including USB plug), width is 1.6" and depth is 0.4". Because of it's width and need to keep the SD Card accessible, this ABK version is typically used with a 2 or 3 foot USB extension cable.

Figure 12A:
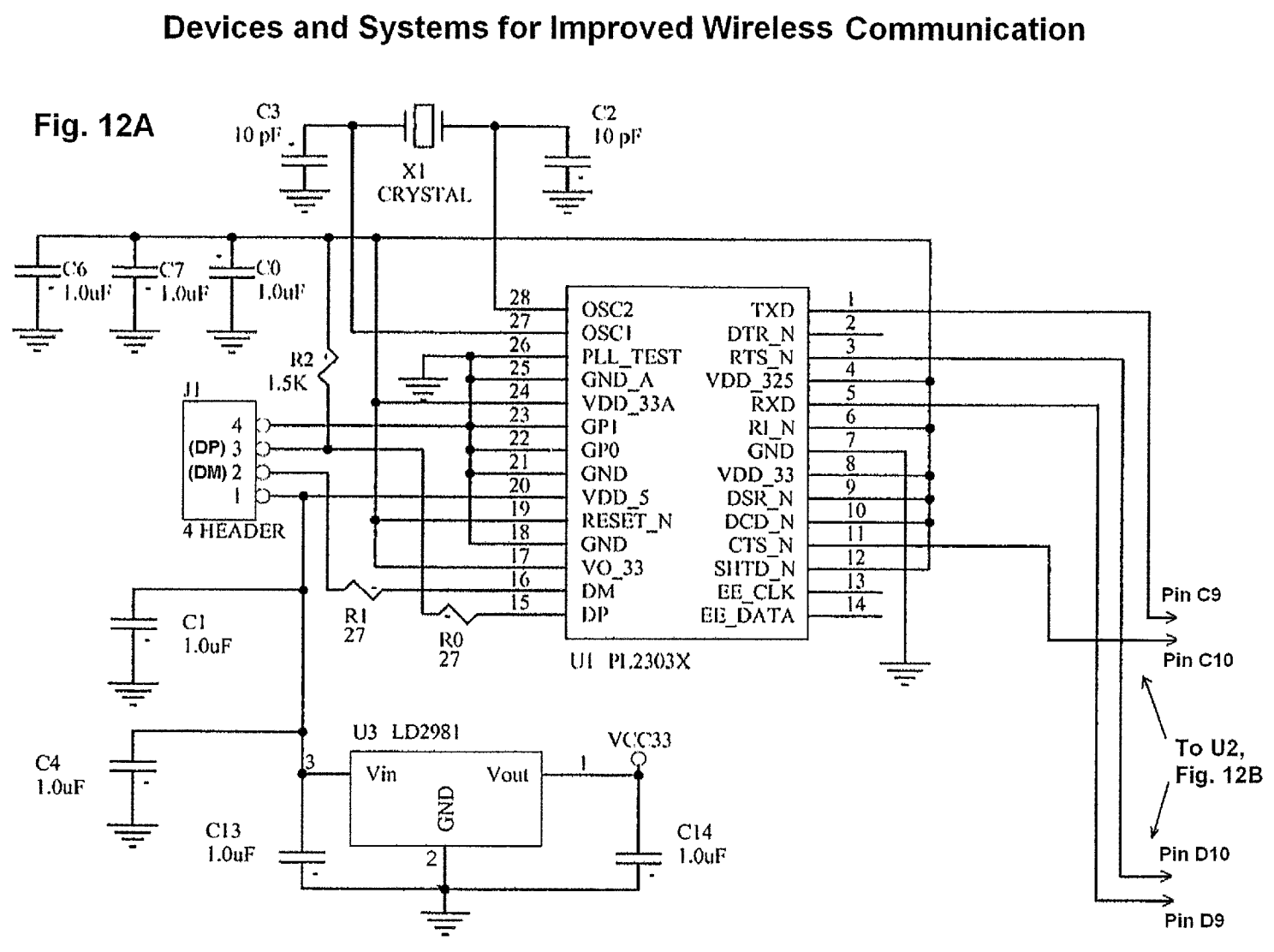
Figure 12B:
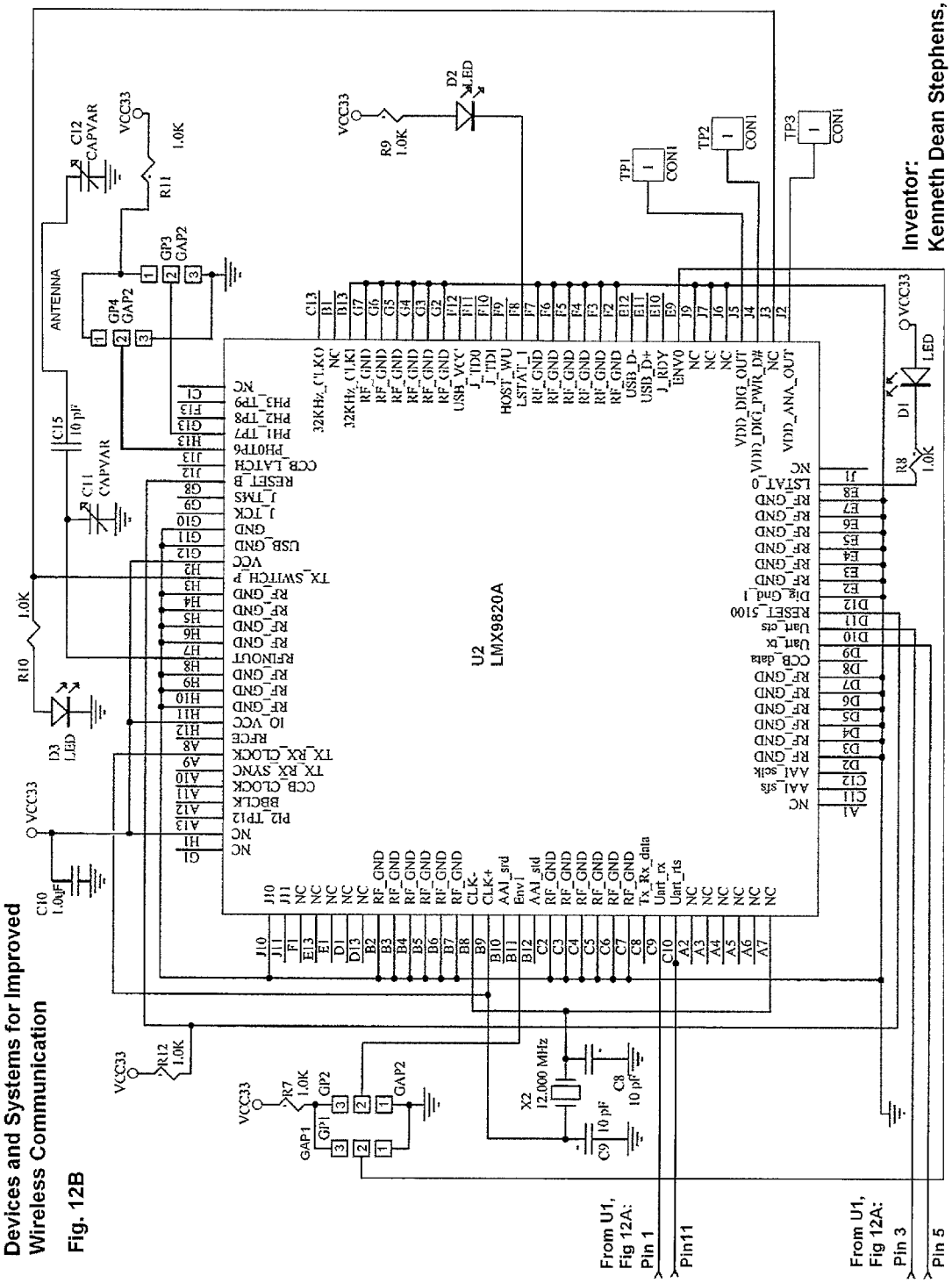

FIGS. 12A-B illustrate one presently preferred embodiment of the Advanced BlueKey® device of FIG. 10A. The USB-to-Serial Adapter 141 of FIG. 10A is shown in schematic form in FIG. 12A, where: J1 is the USB connector to the host computer or device; U1 is the USB-Serial IC, a Prolific Technologies PL-2303X; and U3 is a 5V-to-3.3V power regulator chip.

U2, the larger IC on the right, is a National Semiconductor LMX9820A serial Bluetooth® module. Lines from U1 pins 1, 3, 5 and 11 connect to U3 pins C9, D11, D10 and C10 directly at logic level, with no need for RS-232 driver, interface or other input-output circuitry.

U3 pin H7 goes to an on-board, printed antenna with appropriate means to tune for maximum RF efficiency via variable capacitors C11 and C12. ICs and circuit parts other than those depicted can also be utilized to achieve the desired results.

FIGS. 13A-B show a presently-preferred embodiment of the more complex Advanced BlueKey® device discussed in FIG. 11A. U6 is a USB 2.0 hub IC, model UPD720114 from NEC, Inc. JP4 at far left connects to the computer or other USB host device while JP5 and JP6 are female connectors for USB ports.

Pins 25 and 26 of U6 connect to pins 34 and 33 of U7, a PL-2533 SD Card Reader controller chip from Prolific Technologies. Pins 2, 3, 4, 6, 7 and 8 of U7 lead to SD Card socket J2.

Pins 28 and 29 of USB Hub U6 route to pins 5 and 6 on U1 in FIG. 12A (see J1, pins 3 and 2). This is a PL-2303X IC, the USB-Serial adapter portion of that circuit. From this point on the schematic is the same as that of FIGS. 12A-B. A new LMX9830 Bluetooth Module from National Semiconductor can be accommodated in place of the LMX9820 in either FIGS. 12A-B or FIGS. 13A-B. The newer chip has several advantages, including reduced size, faster throughput speed and lower cost.

Figure 14:
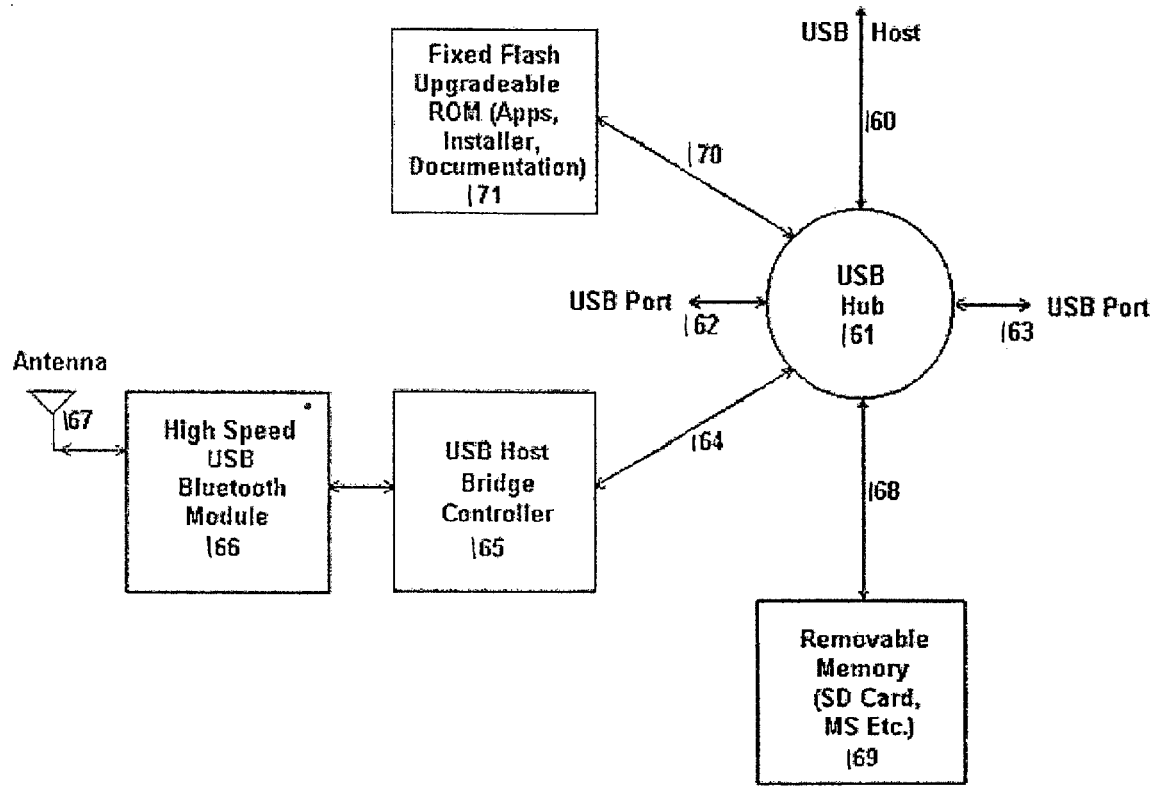
FIG. 14 is an exemplary top-level diagram illustrating an alternative embodiment of the Advanced BlueKey® device of FIGS. 11A-B.

FIG. 14 is a more open and future-looking form of the block diagram described under FIG. 11A wherein a USB Host 160 connects to USB Hub 161, shown with six USB Port outputs. Two of these ports 162 and 163 go to female USB connectors for general availability to the user; if Hub 161 accommodates more ports than 6, more ports can likewise be devoted to general user needs.

At the bottom of the drawing and connected by line 168 to one hub output is a Removable Memory module 169, which comprises a Card Reader for SD cards or their derivatives; Memory Stick; Compact Flash or a number of other card formats. Some Card Reader ICs accommodate multiple card standards and can be employed here as well.

Connected to line 164 is a USB Host Bridge Controller 165 and a High Speed USB Bluetooth® Module 166. Some explanation is necessary to differentiate the functioning of this pair from above-described Bluetooth® devices. USB Host Bridge Controller 165 is a high-speed controller or processor programmed to look like a USB terminal device such as a computer to Windows® and other computer operating systems to achieve the advantage of isolating and masking its companion Bluetooth® device.

One circuit that masks Bluetooth® from Windows® is the USB-Serial Adapter described under FIG. 10A, paragraphs 4 and 5. This configuration works well at current Bluetooth® throughputs, but will be severely limited as Bluetooth® speeds increase in the future, due to restraints placed by Windows® on what it perceives to be a serial communication technology.

Not so in the present case, however: when the Host computer sees a high speed USB bridge to a terminal device, it will allocate available resources to achieving the 480 Mbps throughput of USB 2.0 or even faster in the future. USB Host Bridge Controller 165 also acts as an I/O (input-output) controller for High Speed USB Bluetooth® Module 166, designed to transmit, receive and transmit data several orders of magnitude above today's rates. High Speed USB Bluetooth® Module 166 connects to Antenna 167 and works to 10 or 100 meters depending on its transmitter class.

Block 166 anticipates the arrival of USB Bluetooth® modules capable of many times the data throughput of units currently on the market, particularly as ultra-wideband (UWB) capability is added to the Bluetooth® standard. The unique architecture of section 165 assures high speed capability from the computer to the High Speed USB Bluetooth® module.

Connected to Hub 161 via line 170 is another unique feature of the configuration of FIG. 14, namely, a Fixed Flash Upgradeable ROM (Read Only Memory) module 169 that also attaches to USB Hub 161. The fixed flash memory of module 171 can contain essential ABK install software, BlueKey® and other applications, documentation and, quite possibly, security measures for future firmware access and upgrades.

It will be appreciated that many, if not all, of the component sections comprising FIG. 14 can be manufactured in proprietary form on a single integrated circuit chip to decrease unit cost in high-volume production while maintaining the highest possible throughput, robust physical construction and minimal size.

Figure 15:
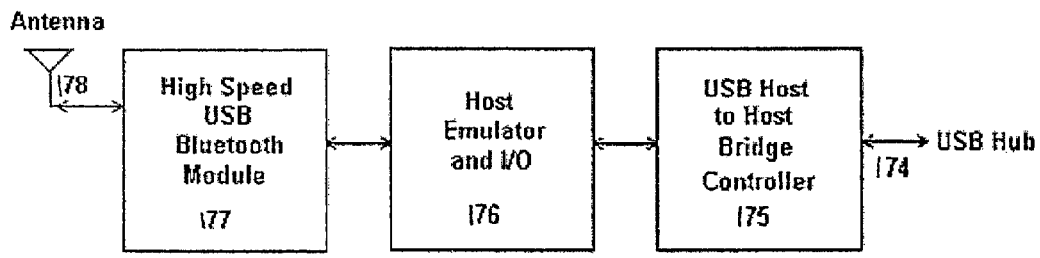
FIG. 15 is an exemplary top-level diagram illustrating another alternative embodiment of the Advanced BlueKey® device of FIGS. 11A-B, wherein the Advanced BlueKey® device further includes a USB Host-to-Host Bridge Controller 175 for forming a high speed USB bridge between two computers.

FIG. 15 depicts a different hardware configuration to mask a High Speed USB Bluetooth® module like the one discussed under FIG. 14. In this iteration, line 174 is the same as connection 164 from the USB Hub in FIG. 14. Line 174 connects a USB Hub like 161 in FIG. 14 to a USB Host-to-Host Bridge Controller 175.

Controller 175 is an IC designed to form a high speed USB bridge between 2 computers, for file and data transfer speed up to USB 2.0's 480 Mbps, approximately 1000 times the throughput of current Bluetooth® devices. An example of such a chip is the PL-2501 made by Prolific Technologies.

Controller 175 is connected to a novel Host Emulator and I/O circuit 176. The purpose of this section is twofold. First, the Host Emulator portion looks and acts like a host computer connected to the other side of Controller 175 so that high speed data can flow between the Emulator and the actual computer USB Host (on line 160 and through a USB Hub 161 in FIG. 14).

Second, circuit 176 serves an I/O (input-output) function, channeling high speed data in and out of High Speed USB Bluetooth® Module 177. In this I/O function, circuit 176 serves as an interface between Bridge Controller 175 and Bluetooth® Module 177. The High Speed USB Bluetooth® Module 177 and it's Antenna 178 are the same as those previously described under FIG. 14 (166, 167).

Figure 16:
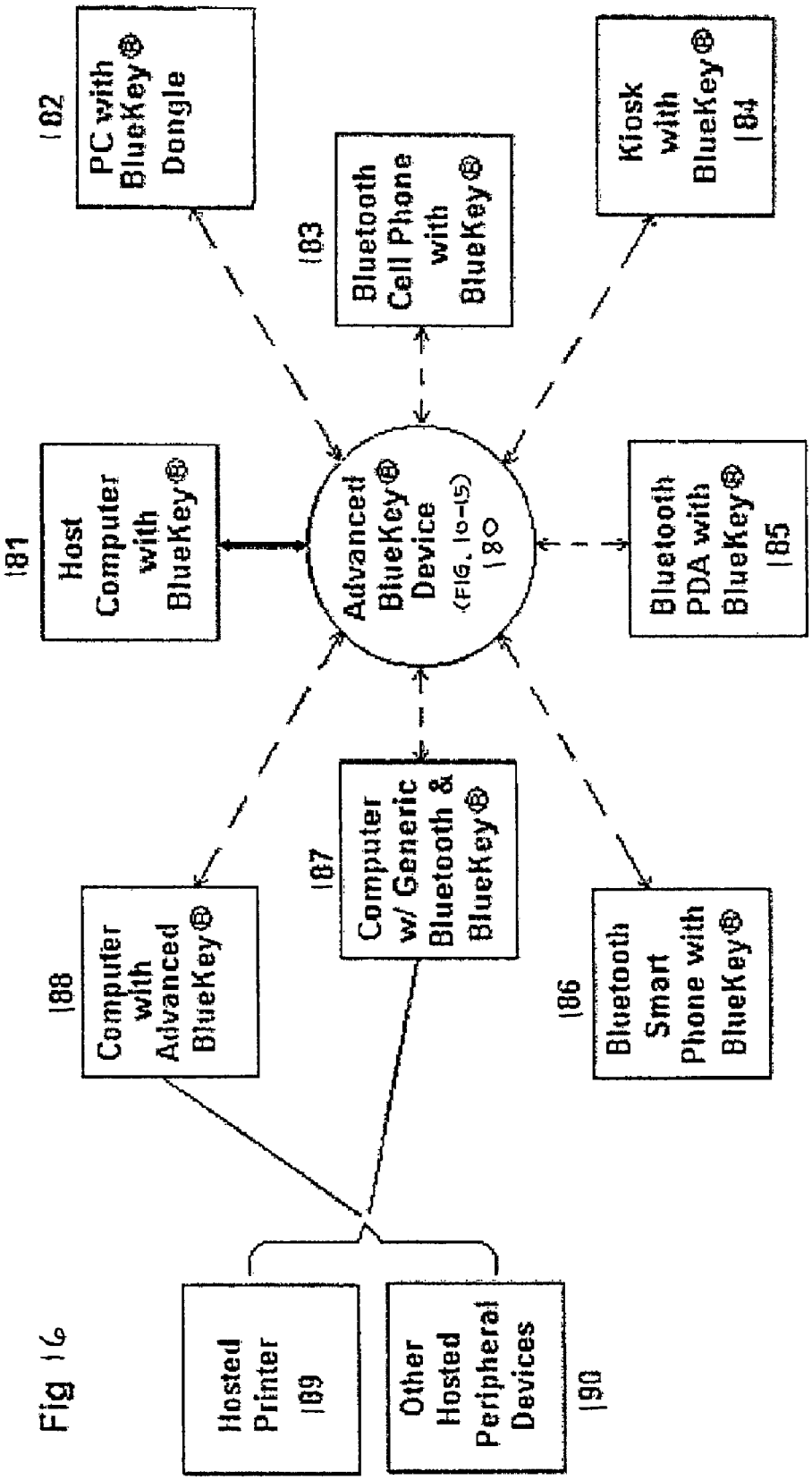
FIG. 16 is an exemplary top-level diagram illustrating a universal connectivity of the Advanced BlueKey® device of FIGS. 10-17.

FIG. 16 illustrates the universal connectivity of the Advanced BlueKey® devices disclosed in the specification in conjunction with the embodiments illustrated in FIGS. 10-13. Circle 180 represents any one such ABK device, connected to a Host Computer 181 with BlueKey® application capability.

Clockwise around the Advanced BlueKey® device are depicted various Bluetooth® and BlueKey® enabled apparatus, all able to quickly connect and exchange files and data with ABK device 181 and it's host computer 181:

Device 182 is a computer with a BlueKey® dongle of the type disclosed above.

Device 183 is a Bluetooth®-equipped cell phone including BlueKey® software on its OS.

Device 184 is a kiosk with BlueKey®. Such a kiosk may be to process and edit photos; sell music or video or vend any number of other products; provide the user with a platform for email, Internet use, printing, editing or whatever: the possibilities are endless.

Device 185 is a Bluetooth®-equipped PDA with BlueKey®, which typically can send emails, address info, memos, documents, expense reports and so on to the ABK Host.

Device 186 is a Bluetooth®-equipped Smart Phone with BlueKey®, which can transfer files and data per the examples under 185 above, and serve phone-specific functions as well.

Device 187 is a computer with generic Bluetooth® capability, whether via an internal Bluetooth® module or outboard USB, PC Card or Serial Bluetooth® dongle. Such "legacy" systems can also connect to ABK and communicate via BlueKey®.

Device 188 is a second computer with Advanced BlueKey®. Obviously this device can likewise connect and share with the ABK device 180 and its computer host 181.

Device 189 is a hosted printer of any make or model that can be connected to a computer like one of those shown in 187 and 188, or to a kiosk or other computer-centered system. There are two distinct advantages of such computer-hosted printing over Bluetooth®-direct printers. The most important is that 99.99% of all printers are hosted by a computer rather than standalone, meaning that what users already have will work fine.

Secondly, BlueKey's® host architecture permits distributed processing, meaning that the file transfer and setup operation takes place in the computer rather than the printer. This is in accord with the natural flow of today's personal computer and printer architecture, where printers cost little and computers do most of the work. Put another way, standalone Bluetooth® printers have not been successful in the marketplace because they require onboard processing power and cost far more than their more passive counterparts.

Block 190 represents any number of other peripheral devices: media drives, display monitors, projectors, game consoles, manufacturing tools, drawing tables, etc. Like printer 189, such devices can be made to perform their specialized functions through a Bluetooth® equipped, BlueKey® enabled computer host.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the invention is to cover all modifications, equivalents, and alternatives falling within the spirit and scope of the claims.

What is claimed is:

1. A communication device for supporting wireless communication between a host system and a target host system, comprising:
   a host adapter that exchanges data signals via a virtual communication port of the host system, said host adapter supporting conversion between the data signals and serial data signals; and
   a wireless transceiver that exchanges the serial data signals with said host adapter, said wireless transceiver converting the serial data signals received from said host adapter into outgoing wireless communication signals for broadcast to the target host system and converting incoming wireless communication signals received from the target host system into the serial data signals for transmission to said host adapter,
   wherein said host adapter, when coupled with the host system, operates as a hardware firewall, rendering said wireless transceiver invisible to an operating system of the host system,
   wherein said target system comprises a host system rather than a peripheral device.

2. The communication device of claim 1, wherein the communication device couples with a Universal Serial Bus (USB) communication port of the host system, the data signals of the host system comprising USB data signals.

3. The communication device of claim 2, wherein said host adapter includes a USB-to-serial Adapter that supports conversion between the USB data signals and the serial data signals.

4. The communication device of claim 1, wherein said host adapter that provides a plurality of virtual communication ports for the host system.

5. The communication device of claim 1, wherein all communication functions for the host system are performed via said virtual communication port.

6. The communication device of claim 1, wherein said wireless transceiver supports wireless communications selected from the group consisting of radio frequency communications and infrared communications.

7. The communication device of claim 6, wherein said radio frequency communications comprise radio frequency communications in accordance with a Bluetooth.RTM. standard.

8. The communication device of claim 1, further comprising a communication hub, wherein said host adapter communicates with the host system via said communication hub.

9. The communication device of claim 8, wherein said communication hub is at least partially integrated with said host adapter and said wireless transceiver.

10. The communication device of claim 8, further comprising a memory card reader, said memory card reader communicating with said host adapter via said communication hub.

11. The communication device of claim 10, wherein said memory card reader comprises a Secure Digital Card Reader.

12. The communication device of claim 10, wherein said memory card reader accommodates removable memory cards with a wide range of memory storage capacity.

13. The communication device of claim 10, wherein said memory card reader is at least partially integrated with said host adapter and said wireless transceiver.

14. The communication device of claim 8, further comprising a read only memory (ROM) system, said ROM system communicating with said host adapter via said communication hub.

15. The communication device of claim 14, wherein said ROM system comprises a Fixed Flash Upgradeable ROM system.

16. The communication device of claim 14, wherein said ROM system stores application software for the communication device.

17. The communication device of claim 14, wherein said ROM system is at least partially integrated with said host adapter and said wireless transceiver.

18. The communication device of claim 1, wherein said host adapter comprises a high-speed host adapter and wherein said wireless transceiver comprises a high-speed wireless transceiver.

19. The communication device of claim 18, wherein said high-speed wireless transceiver supports high-speed wireless communications in accordance with a standard selected from the group consisting of a Bluetooth.RTM. standard and an ultra-wideband (UWB) standard.

20. The communication device of claim 18, wherein said high-speed host adapter includes a host bridge controller that is programmed to look like a USB terminal device to the operating system of the host system.

21. The communication device of claim 20, wherein said host bridge controller is at least partially integrated with said high-speed wireless transceiver.

22. The communication device of claim 18, wherein said high-speed host adapter includes a host-to-host bridge controller, said host-to-host bridge controller communicating with said wireless transceiver via an interface system that emulates a second host system such that said host-to-host bridge controller and said interface system operate as the hardware firewall, said interface system channeling the serial data signals between said host-to-host bridge controller and said high-speed wireless transceiver such that the data signals can be exchanged between said interface system and the host system at a high speed.

23. The communication device of claim 22, wherein said interface system is at least partially integrated with said host-to-host bridge controller and said high-speed wireless transceiver.

24. The communication device of claim 1, wherein said wireless transceiver is at least partially integrated with said host adapter.

25. The communication device of claim 24, wherein said host adapter and said wireless transceiver are integrated into an integrated circuit.

26. A communication device for supporting wireless communication between a host system and a target host system, comprising:
a USB-to-Serial Adapter that exchanges USB data signals over a virtual communication port of the host system,
said USB-to-Serial Adapter being coupled with a USB communication port of the host system and supporting conversion between the USB data signals and serial data signals;
and a Serial Bluetooth.RTM. Adapter that exchanges the serial data signals with said USB-to-Serial Adapter, said Serial Bluetooth.RTM. Adapter converting the serial data signals received from said USB-to-Serial Adapter into outgoing Bluetooth.RTM. communication signals for broadcast to the target host system via an antenna system and converting incoming Bluetooth.RTM. communication signals received from the target host system via said antenna system into the serial data signals for transmission to said USB-to-Serial Adapter,
wherein said USB-to-Serial Adapter, when coupled with the host system, operates as a hardware firewall, rendering said Serial Bluetooth.RTM. Adapter invisible to an operating system of the host system,
wherein said target system comprises a host system rather than a peripheral device.

27. A communication system, comprising:
a Universal Serial Bus (USB) communication hub;
a communication device that supports high-speed wireless communication between a host system and a target system, said communication device including:
a high-speed USB host bridge controller that is programmed to look like a USB terminal device to an operating system of the host system and that exchanges USB data signals over a virtual communication port of the host system at a high data rate, said high-speed USB host bridge controller being coupled with a USB communication port of the host system via said USB communication hub and supporting conversion between the USB data signals and serial data signals;
a high-speed Serial Bluetooth.RTM. Adapter that exchanges the serial data signals with said high-speed USB host bridge controller, said high-speed Serial Bluetooth.RTM. Adapter converting the serial data signals received from said high-speed USB host bridge controller into outgoing high-speed Bluetooth.RTM. communication signals and converting incoming high-speed Bluetooth.RTM. communication signals into the serial data signals for transmission to said high-speed USB host bridge controller; andcan antenna system that is coupled with said high-speed Serial Bluetooth.RTM. Adapter, said antenna system broadcasting the outgoing high-speed Bluetooth.RTM. communication signals to the target system and receiving the incoming high-speed Bluetooth.RTM. communication signals received from the target system; and
a Fixed Flash Upgradeable ROM system that stores application software for the communication device and that communicates with said communication device via said USB communication hub, wherein said high-speed USB host bridge controller, when coupled with the host system, operates as a hardware firewall, rendering said high-speed Serial Bluetooth.RTM. Adapter invisible to an operating system of the host system.

28. A communication system, comprising:
a Universal Serial Bus (USB) communication hub; and
a communication device that supports high-speed wireless communication between a first host system and a target system, said communication device including:
a high-speed USB host-to-host bridge controller that exchanges USB data signals over a virtual communication port of the first host system, said USB host-to-host bridge controller being coupled with a USB communication port of the first host system via said USB communication hub and supporting conversion between the USB data signals and serial data signals; an interface system that emulates a second host system and that channels the serial data signals between said USB host-to-host bridge controller and a high-speed Serial Bluetooth.RTM. Adapter; said Serial Bluetooth.RTM. Adapter converting the serial data signals received from said USB host-to-host bridge controller into outgoing high-speed Bluetooth.RTM. communication signals and converting incoming high-speed Bluetooth.RTM. communication signals into the serial data signals for transmission to said USB host-to-host bridge controller; and an antenna system that is coupled with said Serial Bluetooth.RTM. Adapter, said antenna system broadcasting the outgoing high-speed Bluetooth.RTM. communication signals to the target system and receiving the incoming high-speed Bluetooth.RTM. communication signals received from the target system,
wherein said USB host-to-host bridge controller and said interface system, when coupled with the first host system, operate as a hardware firewall, rendering said Serial Bluetooth.RTM. Adapter invisible to the operating system of the first host system.

\* \* \* \* \*

UNITED STATES PATENT AND TRADEMARK OFFICE
CERTIFICATE OF CORRECTION

| | | |
|---|---|---|
| PATENT NO. | : 7,974,577 B2 | Page 1 of 1 |
| APPLICATION NO. | : 11/685690 | |
| DATED | : July 5, 2011 | |
| INVENTOR(S) | : Kenneth D. Stephens, Jr. | |

It is certified that error appears in the above-identified patent and that said Letters Patent is hereby corrected as shown below:

Title Page should read
(73) Assignee: RMAX, LLC, Shawnee Mission, Kansas (US)

Signed and Sealed this
Third Day of April, 2012

David J. Kappos
*Director of the United States Patent and Trademark Office*